Dec. 6, 1938. J. H. LONSKEY 2,139,622
METAL PULLEY
Filed July 10, 1935
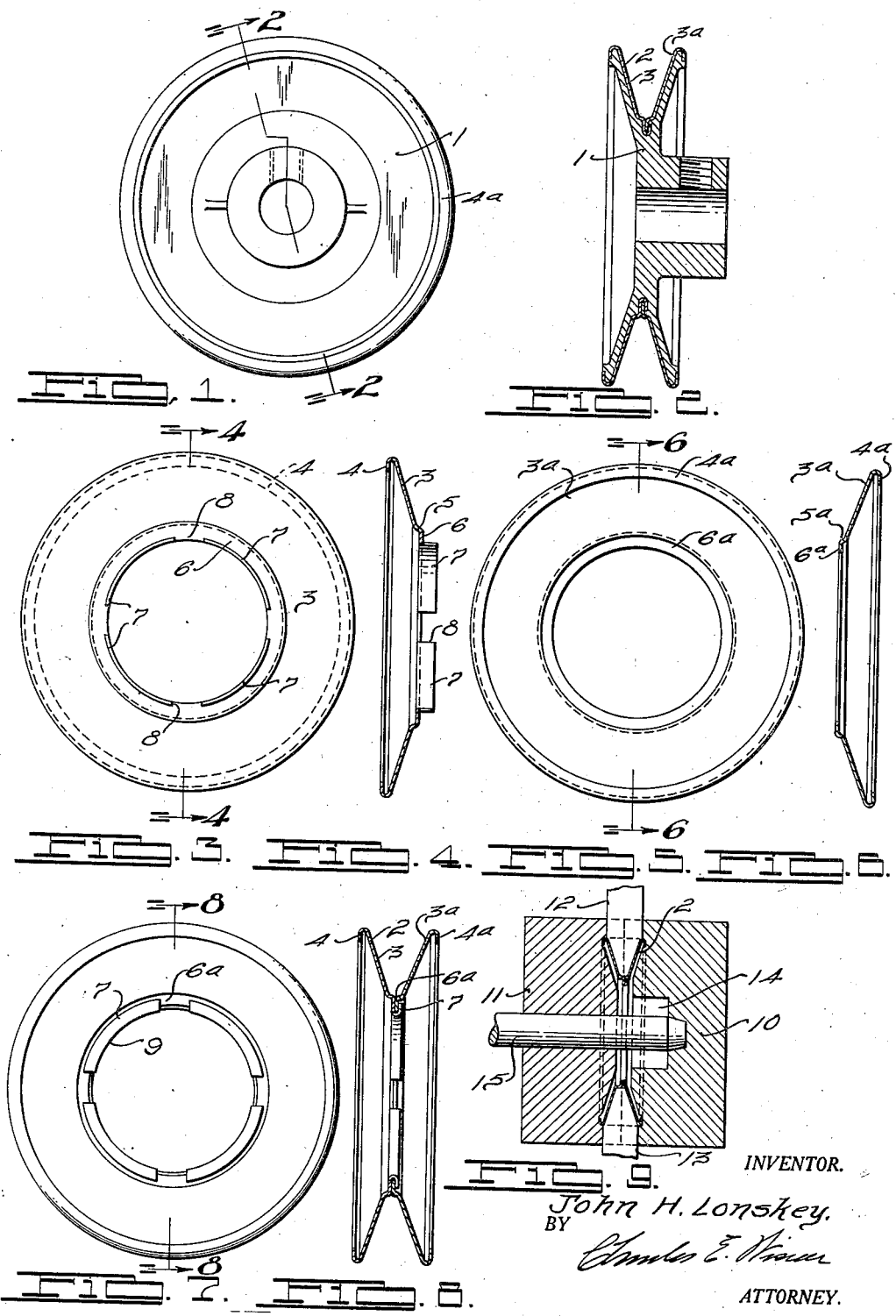
INVENTOR.
John H. Lonskey,
BY
ATTORNEY.

Patented Dec. 6, 1938

2,139,622

UNITED STATES PATENT OFFICE 2,139,622

METAL PULLEY

John H. Lonskey, Ypsilanti, Mich., assignor to Central Specialty Company, Ypsilanti, Mich., a corporation of Michigan Application July 10, 1935, Serial No. 30,590

3 Claims. (Cl. 74—230.5)

This invention relates to metal pulleys, the object being to provide a pulley of composite metal structure to eliminate resonance.

A further object of the invention is to provide a pulley having a comparatively high wear-resistant belt face and a body of less wear-resistant metal cast in place on the said belt face.

It is also an object and feature of the invention to provide a V groove pulley having a sheet metal part forming the groove and a metal body die cast on the sheet metal member.

It is also an object and feature of the invention to provide a sheet metal V grooved rims to form the periphery of a cast metal body in which the V portion is formed of two similar half parts locked together at the center by a rib portion extending into the body of cast metal, which rib portion is notched to prevent slippage of the sheet metal rim relative to the cast body.

These objects and the several novel features of the invention are hereinafter more fully described and claimed, and the preferred form of construction of a pulley embodying my invention is shown in the accompanying drawing in which—

Fig. 1 is a side elevation of my improved pulley.

Fig. 2 is a section taken on line 2—2 of Fig. 1.

Fig. 3 is a side elevation of one half part of the sheet metal V shaped rim element.

Fig. 4 is a section taken on line 4—4 of Fig. 3.

Fig. 5 is an elevation of the companion half part of the V shaped rim member.

Fig. 6 is a section taken on line 6—6 of Fig. 5.

Fig. 7 is a side elevation of the assembled sheet metal part forming a V groove rim or belt face.

Fig. 8 is a section taken on line 8—8 of Fig. 7.

Fig. 9 is a sectional diagrammatic view of a mold showing one method of forming my improved composite pulley.

The composite pulley of my invention comprises a sheet steel face or rim for the belt and a body of die cast metal cast in place in the said rim. The purpose of this composite structure is twofold, first to provide a pulley having a high wear-resistant belt face and second to provide a non-resonant metal pulley. Metal pulleys of one-piece structure are used in many places where the resonance or "sing" of the metal is objectionable as for instance in household refrigerators and in motor belt driven equipment of various types but, by making the pulley body of a composite material such as above indicated, resonance is completely eliminated and a pulley of a much longer life is secured due to the wear-resistant belt surface.

A one-piece die cast pulley has commonly been used heretofore, especially of the V groove type, which has the fault of being resonant and the travel of the belt thereover produces a "sing." Such pulleys are comparatively short lived due to the metal being sufficiently soft as to wear quite rapidly. I have avoided both the resonance and the short life by providing a body 1 which is die cast onto the belt face or rim 2 which is here shown as of the V groove type. The invention, however, is not limited to the V groove as other shapes of cross section of belt face may be provided within the scope of the invention set forth hereinafter.

Preferably, however, the V groove pulley is the more commonly used for household appliances and in accordance with my invention, I provide the V groove of two sheet metal parts, one of the said parts being indicated at 3 as having at its outer edge a return-bent flange 4 and at its inner edge an inbent hub portion 5 and an inwardly projecting body flange 6 parallel with the flange 4. This portion 6 has an edge portion 7 outturned at a right angle thereto to form a series of lugs having spaces 8 therebetween. The other half V part of the rim is formed of sheet metal having a similar return-bent peripheral flange 4ª, a hub 5ª at the inner edge of the inclined portion and a central body flange 6ª parallel with the flange 4ª. These flanges 6 and 6ª of the two sheet metal parts define a peripheral opening when assembled as indicated at 9 in Fig. 7.

The two parts are assembled by inserting the lateral flange portions 7 of the part 3 within the opening of the flange 6ª of the part 3ª and the flanged portion 7 then being bent outwardly toward the periphery over the portion 6ª as shown in Fig. 7 to thereby clamp the two parts together after the manner shown in section in Fig. 8. The sheet metal parts thus assembled form a complete V grooved sheet metal rim member onto which the body of the pulley may be cast.

The manner of casting of the body onto the rim section is not material to this invention but preferably it is die cast thereon and this may be accomplished by placing the rim section 2 between the two portions 10 and 11 of the die, the said die having movable parts 12 and 13 by which, when moved inwardly as shown in Fig. 9, support the rim section 2 from displacement. The faces of the die sections 10 and 11 are so spaced and shaped as to provide the desired shape of body section and including a hub portion 14 in the die part 10. An insertible shaft like member 15 extends through the die part 11 and into the section 14 to provide a shaft opening. With the parts assembled as shown and the molten metal forced under pressure into the space between the die parts, the rim section forms the face of the mold and is cast in place with the inturned flanges 4 and 4a forming the outer periphery of the edges of the V groove of the finished pulley and also providing a recess between the flange and the body of the portion 3 or 3a into which the die cast metal will flow.

The pulley can be made with a rim section of other form than the preferred form here shown but it is especially desirable that a means be provided to prevent possible slippage of the rim section on the body. This may be accomplished by the recesses 8 heretofore mentioned, which form pockets into which the cast metal flows and prevents rotative displacement of the rim section.

The provision of a sheet metal rim section on a cast body of a softer metal results in considerable strength being added to the pulley structure making it possible to transmit more power from pulley to pulley without breakdown or splitting of the groove under heavy load. While it is preferable to utilize a steel rim section, other metals might be utilized as may be desirable for specific purposes without departing from the spirit and scope of the invention as defined by the appended claims.

It is believed evident from the foregoing description that the pulley is of very simple and inexpensive construction; that the belt face or rim of high wear-resistant material is provided on a soft metal body and serves the purpose of providing for long life of the pulley and non-resonant character, and that the various objects of the invention are attained by the construction described.

Having thus briefly described my invention, its utility and mode of operation, what I claim and desire to secure by Letters Patent of the United States is:

1. A metal pulley comprising a peripheral rim of sheet metal formed of two similar half parts of ring form, said parts being united side by side to form a rim of V shape in cross section, the outer edges of the said flanges being outwardly and reversely bent to provide a recess on each side of the rim opening toward the center, and a metal body cast in place in the rim, and seated in the recesses formed by the reversely bent flange edges.

2. A composite metal pulley consisting of a rim of sheet metal shaped to provide a rim of V form in cross section, a metal body cast onto the said rim section and providing the sole support therefor, said rim having the terminal edges reversely bent to receive the cast metal and having portions at its inner periphery interlocking with the cast metal to prevent relative rotation of the rim and body.

3. A metal pulley comprising a sheet metal rim portion formed of two like parts united in side by side relation to form a V shaped belt recess, the two parts each having the outer edge return bent in spaced relation with the body thereof, means at the inner edges locking the two metal parts of the rim together, and a cast metal body forming a solid body for the wheel and extending into the recesses formed by the return bent edges whereby the sheet metal is supported in place and retained in form by the cast metal, said cast metal at the center being arranged for mounting on a shaft.

JOHN H. LONSKEY.